April 27, 1937. F. W. O. DORL ET AL 2,078,840
VAPORTIGHT EXTERIORLY HEATED ELECTRIC BAKING OVEN
Filed Nov. 14, 1933 3 Sheets-Sheet 1
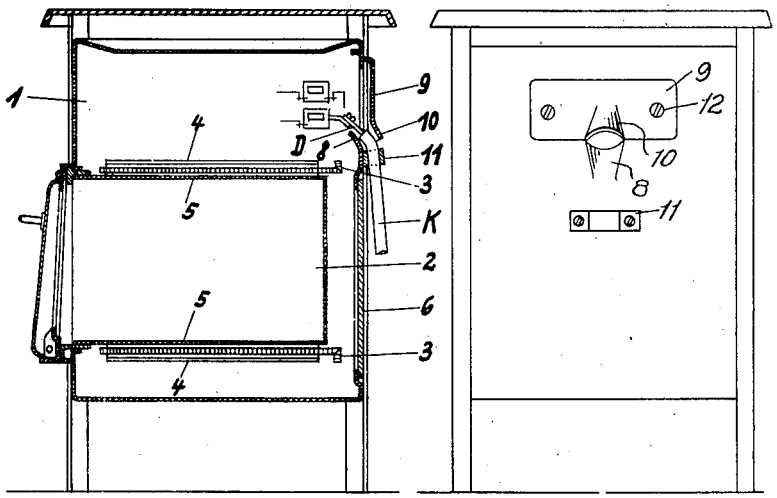
Fig. 1.
Fig. 11
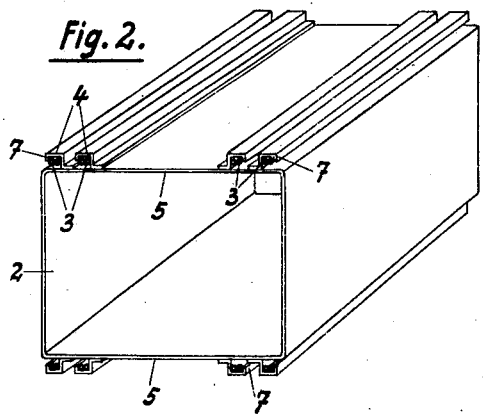
Fig. 2.
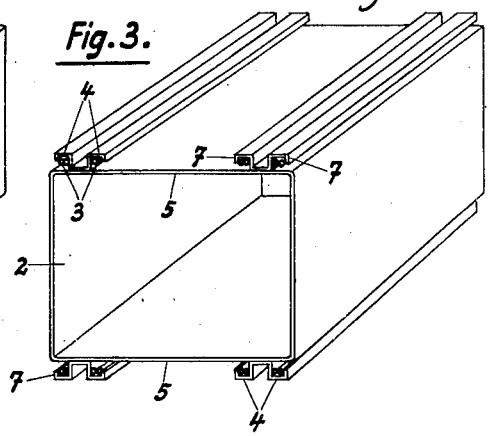
Fig. 3.
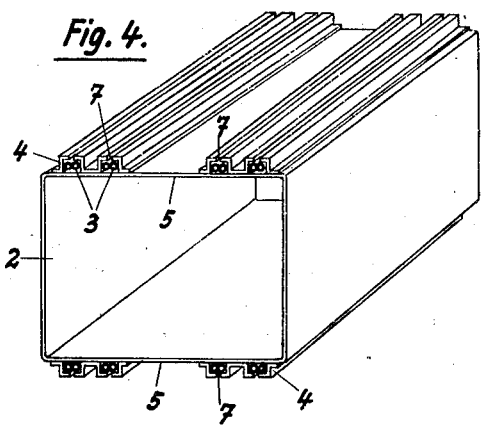
Fig. 4.
Fig. 5.
Fig. 6.
Fig. 7.
Fig. 8.
Fig. 9.
Fig. 10.
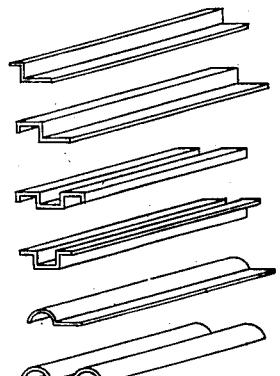
Inventors
Friedrich W. O. Dorl
Alfred Schnitzler
By Sommers & Young Attys.

April 27, 1937.    F. W. O. DORL ET AL    2,078,840
VAPORTIGHT EXTERIORLY HEATED ELECTRIC BAKING OVEN
Filed Nov. 14, 1933    3 Sheets-Sheet 2

Inventors
Friedrich W. O. Dorl.
Alfred Schnitzler.
By Sommers & Young, Attys.

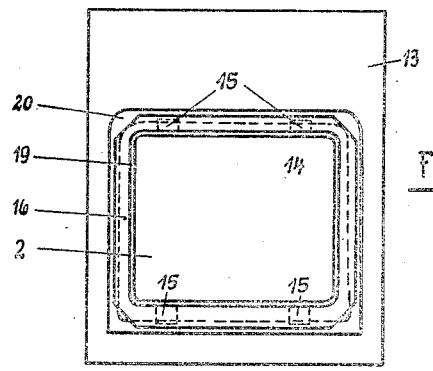
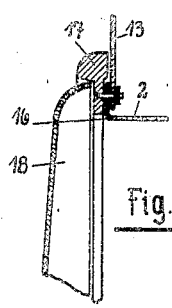
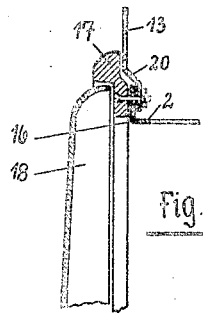
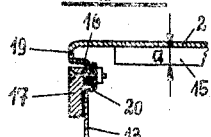
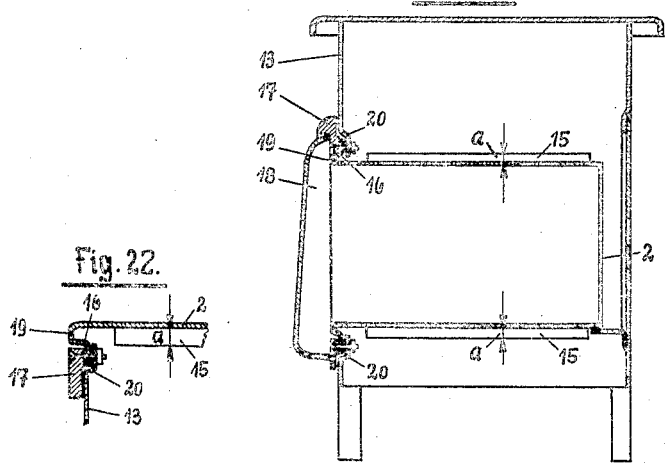

Patented Apr. 27, 1937

2,078,840

UNITED STATES PATENT OFFICE

2,078,840

VAPORTIGHT EXTERIORLY HEATED ELECTRIC BAKING OVEN

Friedrich Wilhelm Oscar Dorl and Alfred Schnitzler, Karlsruhe in Baden, Germany, assignors to the Corporation of Junker & Ruh A.-G., Karlsruhe in Baden, Germany Application November 14, 1933, Serial No. 697,998
In Germany November 17, 1932

8 Claims. (Cl. 219—35)

In order to facilitate the exchange of the heating elements in outside heated electric baking ovens, which also must be vapor-tight, from the rear end of the oven, while effecting at the same time a good transmission of the heat to the baking chamber of the oven, so called radiating heating elements have customarily been used, the heat transmission of which consists principally in radiant heat. With these heating elements no special forcing pressure against the wall of the inner tube to be heated is required. Therefore an easy mounting and withdrawing of these heating elements without special application of force is possible. In order to facilitate this mounting and withdrawing of the elements and at the same time to make the manufacturing method of the covers required for the heat-transmission to the oven baking chamber as simple as possible, on the outside of the air-tight constructed baking chamber, channels are provided. These channels generally are entirely closed and are, with the well known constructions, solidly connected with the inside or the outside of the baking chamber, or they are manufactured directly from the material of the baking chamber by pressing them out of the material in form of grooves or the like and covering same by means of sheet-iron strips. This manufacturing method of the channels for the reception of the heating elements is troublesome and expensive and necessitates besides several welding- and soldering-seams for these channels.

The present invention takes a different way. On the outside of the smooth and air-tight manufactured baking chamber, instead of providing closed channels by means of welding, soldering or the like, preferably Z-shaped, U-Z-shaped, U-shaped or double-U-shaped rails or the combination of both forms of construction, corresponding to the same sense of form, perhaps also in rounded shapes are thus arranged, that in the lengthwise direction of the inner baking chamber air-slits are produced. By applying so-formed channels, heat-absorbent ribs, similar to those of electric cooking plates are produced, transmitting the heat in a very good manner onto the body of the baking chamber of the oven. These parts with such profiles may be solidly connected onto the baking chamber by inexpensive means, for instance by welding or soldering. Furthermore they make it possible to facilitate the mounting and removing of the heating elements and the exchange of the heating elements from the rear of the baking oven, without removing the baking chamber from the casing of the range. The easy exchange of the heating elements is supported by means of the ingenious and simple arrangement of the introduction of the cable, in which the connecting terminals are not fastened in the usual manner in a separate connecting box, but are mounted directly on the back wall of the range, by which means a much simpler construction of the introduction of the cable also for the connection of the range is effected. This introduction of the cable is formed that way, that the back-wall of the range is forced in one place semicircularly and slantingly towards the inside, and that for the corresponding piece a comparatively low connecting cap is provided, which in its lower part, corresponding to the impression in the back-wall of the range, is also forced semicircularly and slantingly, but towards the outside. The round opening formed by the connection of these two parts serves for the introduction of the cable and allows connection of the cable to the connecting terminals of the range slanting from below without much bending. The connecting cap itself is fastened by means of two screws on the back wall of the range.

With this arrangement it is also possible to set the necessary strain-relieving clamp as usual outside of the connecting cap, so that same is always well cooled. With baking ovens with electric heating, special attention is to be laid on vapor-tightness and particularly on the connection of the baking-oven with the rest of the range-body, and specially of the front wall.

The arrangement of the heat-absorbent carrier ribs for the reception of the heat-radiating-elements on the outside of the baking oven necessitates a very careful treatment of this problem. For producing a vapor-tight cover towards the front-wall of the range the baking oven is provided with a surrounding flange which may be set back towards the front rim of the baking chamber by a certain distance. The flange is pressed vapor-tight against the front wall by means of the door-frame or by means of the screws. For improving the tightness, the front-wall may be provided with a surrounding groove. With most of the oven-constructions either the front flange of the baking oven is pressed from the rear against the backward face of the front wall of the range whereat, because leakages between the front wall and the flange of the baking chamber are unavoidable, vapor and moisture may proceed into the inner of the range, or the entire baking chamber must be introduced from the front through the opening in the front-wall. Because in the latter case the flange of the baking chamber, which for manufacturing reasons cannot be made very wide, conditions a comparatively low opening in the front wall and because it has been found out, that the heating effect is considerably higher if the frame for the heating-elements (heat-absorbent-ribs) are fastened directly to the body of the baking-chamber, with this construction generally only heating-elements of a very low height of construction may be used, mostly mica-heating-elements. These however have different drawbacks, as: They can be loaded only very slowly, they are very little resistant against burning and finally, when removing a defective heating-element, the dismounting of the entire baking oven is necessary.

By the object of the invention all the mentioned drawbacks will be removed by introducing the baking chamber not from the front but from the back of the range into the front opening.

The invention is illustrated in the enclosed drawings in which Fig. 1 is a diagrammatic side sectional view showing the arrangement of the radiating heating elements in connection with the baking oven within a range. Fig. 2 shows the arrangement of U-Z-shaped rails as channels. Fig. 3 shows double-U-shaped rails. Fig. 4 shows U-shaped rails. Figs. 5–10 show different profile-shapes of the rails. Fig. 11 is a view from the rear. Fig. 12 is a front view of the front oven opening showing the baking chamber being inserted in assembled position from the rear. Fig. 13 is an enlarged side sectional view of the baking chamber in assembled position, illustrating the height of the heating element ribs. Fig. 14 is a front view of the front oven opening with the baking chamber removed. Fig. 15 is a rear view of the baking chamber illustrating the shape and size of its flange. Fig. 16 is a front view of a modified shape of front opening of the oven. Fig. 17 is a rear view of a modified shape of baking chamber flange. Fig. 18 shows the construction of the surrounding flange of the baking chamber in a front view, and the Figs. 19–22 different kinds of construction of the connection between the range-wall and the baking-chamber.

In the frame of the range 1 the baking-chamber 2 is built. The heat-absorbent-ribs 4 receive similarly as in the electric cooking-plates the part of the outgoing heat of the heating elements 3 and lead it towards the inner chamber 2 of the baking oven. The form of same is shown in such a way, that almost the entire heat sent out by radiation from the heating elements 3 will be led towards the inner chamber 2. The heating elements 3 which may be easily mounted through the back wall 6 of the range 1 may easily be removed with the aid of suitable instruments through the slits 7, in case an exchange is necessary, especially if a sticking in the channels has occurred. Therefore it is also not necessary to remove the inner chamber from the range.

With the cable-introduction illustrated in Figs. 1 and 12, 6 is the back-wall of the range, 8 is the inwardly slanting semicircular embossed lip, 9 is the connecting-cap with the slanting, semicircular outwardly forced embossed lip 10, and 11 is the strain-relieving clamp into which the cable is clamped. 12 signifies the screws for the fastening of the connecting-cap.

When mounting the baking chamber in the range the chamber is inserted with the flanged end foremost through the rear opening until the flange 16 is adjacent the front wall 13 of the range. The baking chamber is then tilted rearwardly downwardly and rearwardly to the left and the lower left corner of the baking chamber is inserted through the front opening. The baking chamber is then pivoted about a point at the upper left hand corner so that the rear portion moves in a counterclockwise arc. This motion will bring the entire flange 16 of the baking chamber through the front opening of the range. A clamping plate 17 is then secured in position over the flange 16 to prevent undesired dislodgement. In disassembling the clamping plate 17 is removed and the baking chamber is moved to the lower left and then swung so that the rear passes downwardly and to the left. This motion frees the upper right corner of the flange. A clockwise motion of the rear of the chamber brings the entire flange through the front opening. By these means, height $a$, Fig. 13, of the electric heating-elements (heat-absorbent ribs) 15 may be chosen as high as desired, and by these means the application of high grade heating-elements, for instance of radiating heating-elements with little masses and of high heating effect, will be possible. Heating-elements of this kind are practically free of the above mentioned drawbacks.

The flange 16 of the baking-chamber is chosen of such shape, that when mounting the door-frame 17 for the oven-door 18, the flange 16 of the baking-chamber 2 forms on all sides an absolutely vapor-tight closure against the front-wall and the inner parts of the range.

The length of the dimensions $d$ and $e$ of the casing opening 14 are greater than the dimensions $h$ and $w$, respectively, from the outside of the flange to the opposite point on the exterior surface of the baking chamber immediately behind the flange so that the length of the diagonal $b$ of the front wall opening is larger than the diagonal $c$ from the outside diameter of one corner of the flange of the baking chamber to the opposite exterior front corner of the chamber, while the width $d$ and the height $e$ of the opening in the front wall are smaller than the entire width $f$ and the height $g$, respectively, of the flange of the baking chamber.

In order to prevent that steam, boiled-over food and water, when washing out the baking chamber, enter between the door-frame and the baking chamber-flange, the flange 16 may be set back by a certain distance $h$ towards the front-rim 19 of the baking-chamber 2, by which means the tightening joint will be covered.

Fig. 15 illustrates the baking-chamber-flange, flattened at the corners, while Fig. 14 shows the corresponding front wall, the corners of which are rounded out at the upper side of the opening. Figs. 16 and 17 illustrate the same, only the flange-corners are not flattened but rounded out, while the opening in the front-wall 14 is rectangular.

In Fig. 18 the construction of the surrounding flange 16 of the baking-chamber 2 is illustrated in a front view.

Fig. 19 illustrates a further example of construction without the surrounding groove 20 in the front-wall of the range and here the flange is not set back towards the front rim of the baking chamber.

Fig. 20 shows a further example with a surrounding groove 19 in the front wall, the baking chamber flange being not set back.

Fig. 21 illustrates the ready mounted construction with door-frame and door.

Figure 12:
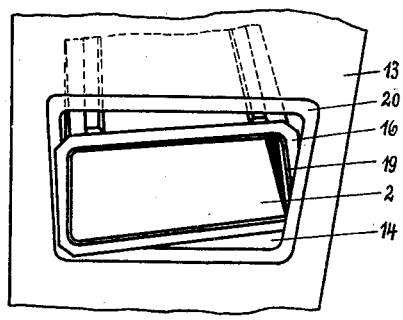
Figure 13:
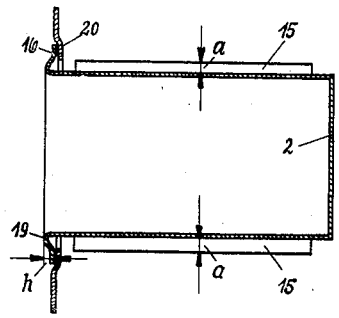
Figure 14:
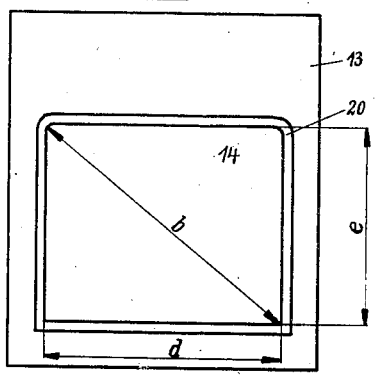
Figure 15:
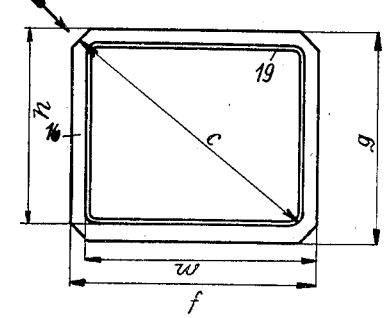
Figure 16:
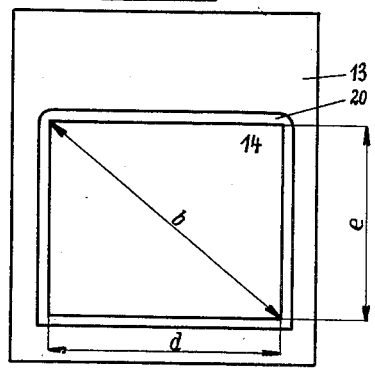
Figure 17:
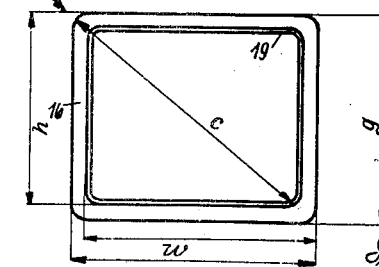

In Fig. 22 is illustrated in an enlarged scale how at a flange, which is set back by a certain distance towards the front rim of the tube, the joint between the door-frame and the baking chamber-flange is covered.

We claim:

1. In an electric range, a vapor-tight baking chamber, heat absorbent ribs attached to the said chamber over an extended area of heat conductive contact and carrying removable heating elements, said ribs having open slits extending longitudinally the entire length thereof, the heating elements being entirely surrounded by said ribs and the walls of said chamber except for the said slits of said ribs.

2. An electric range according to claim 1 in which the slits of the ribs are at the opposite sides from the baking chamber and the attachment of the ribs to the baking chamber is by welding or soldering whereby high heat conductivity between the ribs and chamber is obtained.

3. An electric range according to claim 1 in which each rib forms two longitudinally extending heating element pockets, the ribs being attached to the baking chamber by soldering or welding portions of the ribs intermediate of the two pockets to provide high heat exchange between said ribs and chamber.

4. An electric range according to claim 1 in which the ribs are attached on the outside of the baking chamber.

5. An electric range having an outer casing provided with a door opening through its front wall, the front of the baking chamber having an outwardly extending flange engaging the front face of the front wall of the outer casing, a door frame secured to the outer casing around the said door opening and pressing the flange of the baking chamber against the outer casing wall, the exterior dimensions of the front end of the baking chamber proper being less than the corresponding dimensions of the door opening of the outer casing and the width of the flange of the baking chamber being sufficiently narrow that distance from a side of the baking chamber proper to the edge of the chamber flange on the opposite side is less than the corresponding casing opening.

6. An electric range having an outer casing provided with a door opening through its front wall, the front of the baking chamber having an outwardly extending flange engaging the front face of the front wall of the outer casing, a door frame secured to the outer casing around the said door opening and pressing the flange of the baking chamber against the outer casing wall, the length of a diagonal of the door opening being greater than the length of a diagonal from an exterior corner of the baking chamber to the diagonally opposite corner of the flange, the width and height of the door opening being smaller than the corresponding outside dimensions of the flange.

7. An electric range having an outer casing provided with a door opening at its front wall, the front of the baking chamber having an outwardly extending flange engaging the front face of the front wall of the outer casing, a door frame secured to the outer casing around the said door opening and pressing the flange of the baking chamber against the outer casing wall, the portion of the front wall of the outer casing against which the flange engages being inwardly recessed whereby the joint between the flange and casing is covered, the length of a diagonal of the door opening being greater than the length of the corresponding diagonal from an exterior corner of the baking chamber to the diagonally opposite outside corner of the flange, the width and height of the door opening being smaller than the corresponding outside dimensions of the flange.

8. An electric range according to claim 1, having an outer casing provided with an opening, a detachable cover plate for said opening, said plate having a curved outwardly and downwardly extending lip and having an inwardly and upwardly extending lip, said lips providing an opening therebetween, and an upwardly inclined cable passing through said opening and connected with said heating elements.

FRIEDRICH WILHELM OSCAR DORL.
ALFRED SCHNITZLER.